Nov. 5, 1935.  C. F. RAUEN  2,020,040

POWER TRANSMITTING MECHANISM

Filed Sept. 29, 1930  2 Sheets-Sheet 1

INVENTOR.
Carl F. Rauen.
BY
Charles Hill
ATTORNEYS.

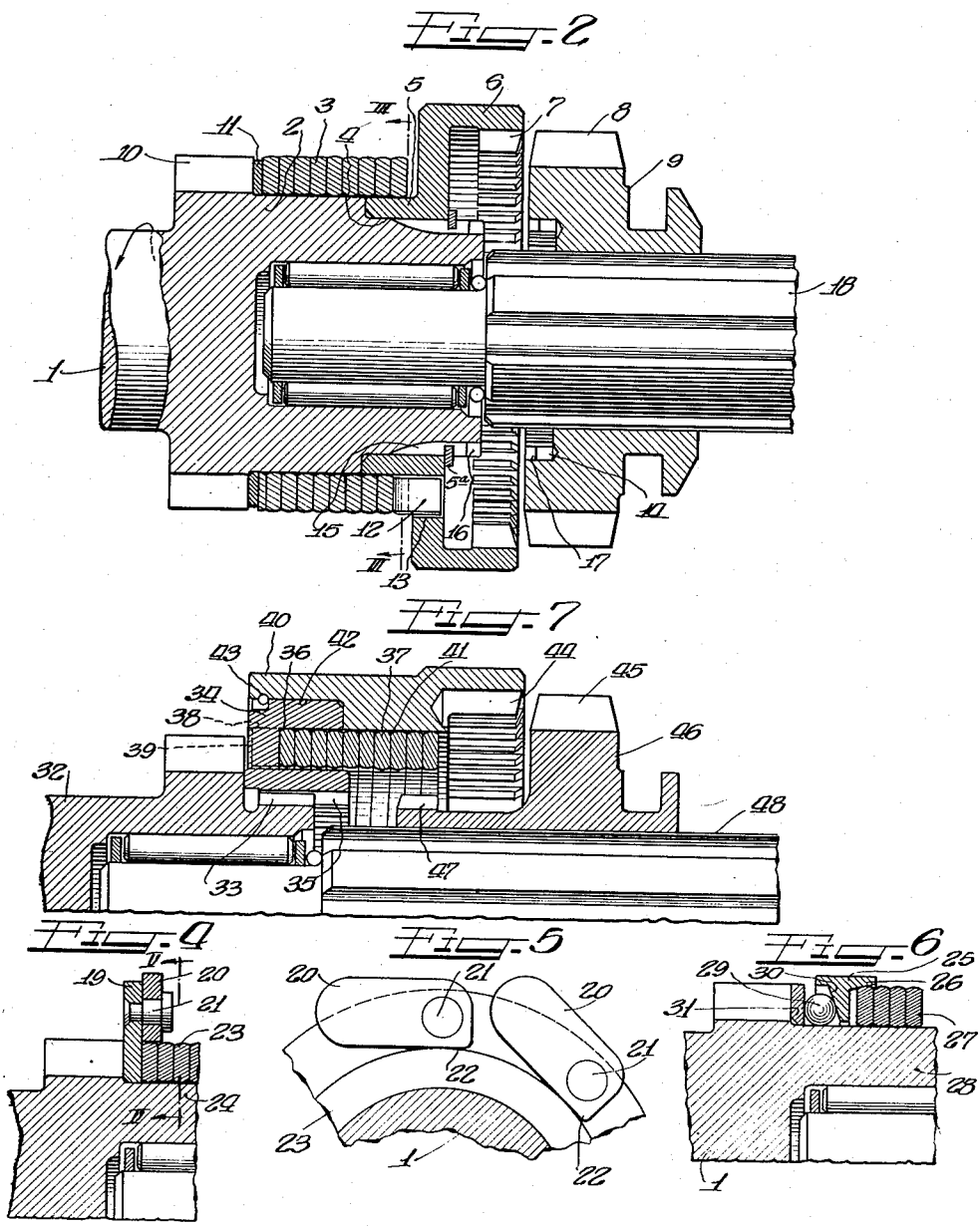

Patented Nov. 5, 1935

2,020,040

UNITED STATES PATENT OFFICE 2,020,040

POWER TRANSMITTING MECHANISM

Carl F. Rauen, Detroit, Mich.

Application September 29, 1930, Serial No. 485,072

9 Claims. (Cl. 192—48)

This invention relates to power transmission systems.

In transmissions of the character now universally in use, a very material drawback resides in the fact that when the speed of the vehicle propelling shaft tends to exceed that of the engine shaft, the engine acts as a brake or "drag". This is particularly noticeable when the car is moving at high speed, although this action of the engine makes itself felt even to some extent at medium speeds. This action is due to the fact that when the transmission gears are set for a direct drive, the connection between the driving shaft and the driven shaft is such that they must move together, regardless of direction or speed.

When driving on the open road, at relatively high speed, it is often desirable to release the accelerator and at the same time continue moving at substantially the same speed as that acquired immediately before release of the accelerator, that is, to coast.

Attempts have heretofore been made to accomplish the above end by the employment of one-way or overrunning clutches in the transmission structures, such clutch means involving rollers or ratchets which often require a complete reorganization of conventional transmission in which they are intended to be employed.

It is accordingly one of the principal objects of my invention to provide a new and improved transmission system employing a one-way drive construction which may be embodied in the usual transmission system without reorganization thereof and which involves a minimum of parts.

A further object of the invention resides in the provision, in connection with a transmission, of means accomplishing the above ends by the use of a novel clutch arrangement.

A still further object of the invention lies in the provision of an improved clutch for one-way drives, said clutch embodying as one of its essential parts a member capable of contraction and expansion.

My invention contemplates as a further object the employment of a novel friction clutch arrangement involving a minimum of moving parts whereby the vehicle will be allowed to coast when desired and the drive shaft and driven shaft may be recoupled for direct drive so that the engine shaft may act as a brake with respect to the propeller shaft when the speed of the latter tends to exceed that of the former.

Another object of no little importance in this connection is accomplished by the provision of a novel one-way clutch which not only provides for free wheeling as well as direct drive, but also makes possible the shifting from the next lower speed drive to each of these drives without requiring the use of the main transmission clutch, thereby eliminating an operation heretofore necessary in transmission systems.

In carrying out my invention, I employ a one-way or overrunning clutch in conjunction with the driving and propeller shafts of a transmission and connected against axial or longitudinal movement relative to the driving shaft. One of the clutch parts is rotatable with respect to the driving shaft and a resilient clutch member in the form of a coiled spring is confined longitudinally between the other clutch parts and said shaft and may be connected against rotation relative to either of said other clutch parts or said shaft. The spring is normally in frictional engagement with the part with which it is not interlocked and it is thereby evident that said spring acts to set up a clutch arrangement between said parts, for a one-way drive. The shaft and the other clutch part are provided with teeth, and the slidable toothed member on the transmission main shaft is movable for engagement first with the teeth of the other clutch part for establishing a oneway drive between said shafts, and then with the teeth of the driving shaft, to establish a direct drive between said shafts and "short circuit" the one-way drive, the latter operation being in response to an extended or overshift of the gear shift lever.

An outstanding advantage of my invention resides in the fact that it may be applied to the conventional type of transmission with a very small change in its structure, and the parts are so extremely simple that they may be manufactured at a very low cost and may be readily assembled and disassembled. In view of the fact that the clutch parts come into play for the most part at higher speeds, the load borne by them is quite small so that the parts may be of light construction if so desired. Moreover, it is noted that with a transmission embodying my invention, the vehicle may be operated so as to take advantage of the free wheeling or coasting feature, or not, depending upon the will of the driver, and the additional effort required in setting up the direct drive is practically negligible.

The spring element of my improved clutch, which corresponds to the pawls of a ratchet clutch and to the rollers of a roller clutch, is subject to very little wear, compared to such pawls and rollers, so that the life of my clutch is substantially greater than that of other types of clutches.

Other and further important objects and advantages of this invention will be apparent from the disclosure in the specification and the accompanying drawings.

This invention (in a preferred form) is illustrated in the drawings and hereinafter more fully described.

On the drawings:

Figure 2 is an enlarged fragmentary sectional view showing more clearly the particular clutch details illustrated in Figure 1.

Figure 4 shows an improvement applied to the clutch construction of Figures 1, 2 and 3 to insure proper operation at all speeds.

Figure 5 is a fragmentary sectional view taken substantially in the plane indicated by the line V—V in Figure 4.

Figure 6 shows a modified form of the structure of Figure 5.

Figure 7 depicts, in fragmentary sectional view, a modified clutch construction.

Figure 1:
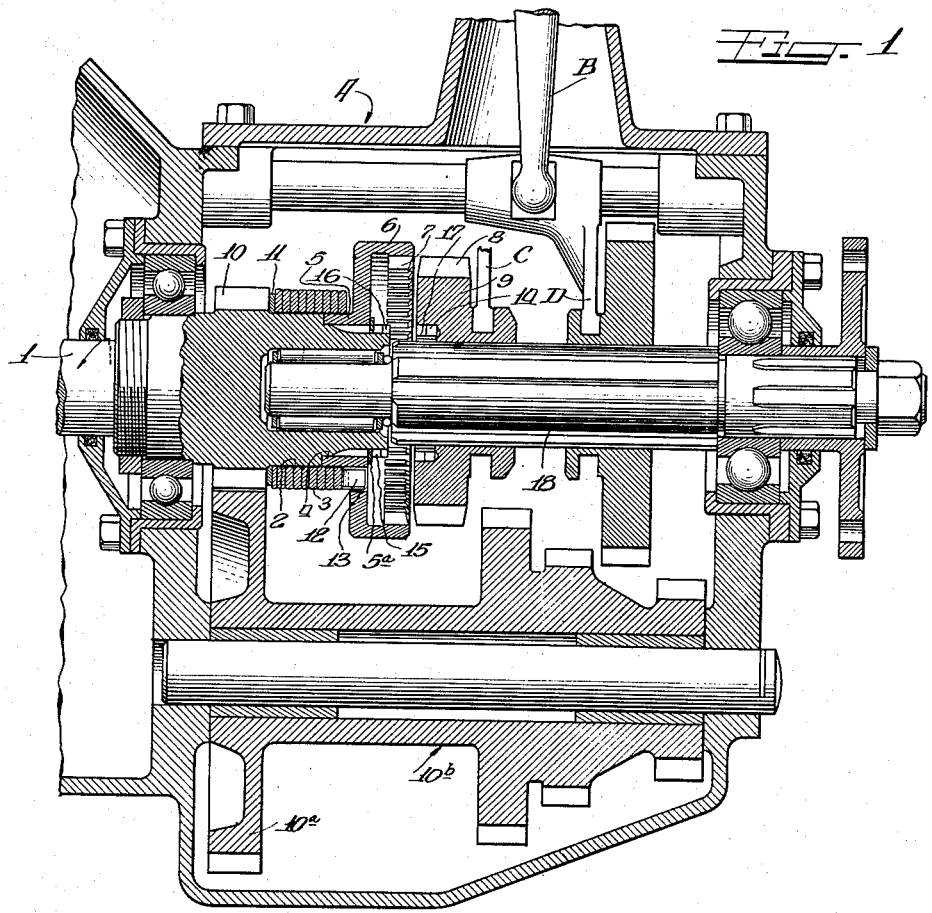
Figure 1 is a fragmentary sectional view through a transmission constructed in accordance with my invention, showing one form of my overrunning clutch or free wheeling mechanism, certain parts appearing in elevation.
Figure 3:
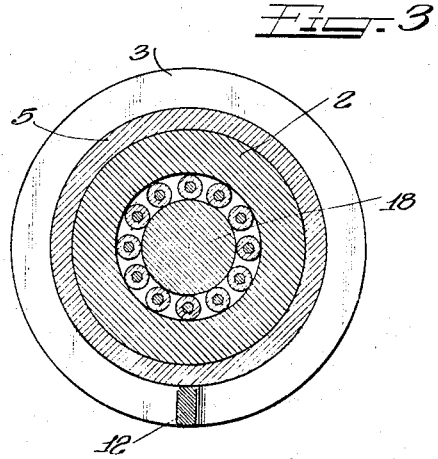
Figure 3 is a sectional view taken approximately in the plane designated by the line III—III in Figure 2.

Referring now more particularly to the drawings, wherein the same characters refer to identical parts, the drive or clutch shaft 1 of the transmission, generally indicated at A, is connected to the engine through the usual clutching means (not shown) and is provided with teeth 10, adapted to mesh with the gear 10a of the counter shaft gear arrangement 10b, rotatably mounted on the counter shaft. The gear 9 is slidably splined on the driven or propeller shaft 18 and when slid to the right, as viewed in Figure 1, it will mesh with the second speed gear of the counter shaft cluster, thereby giving second speed as is conventional in present automobile transmissions. The gear 9 is also provided with suitable clutch teeth 14, the function of which will appear as the description proceeds.

The shaft 1 is provided with a drum 2, having a diameter preferably larger than the normal internal diameter of the spring clutch member 3. The drum 2 has a reduced diameter at 4 on which is concentrically and rotatably mounted the tubular drum 5, the outside diameter of which is the same as that of the drum 2. Formed integral with or otherwise securely fastened to the drum 5 is an enlarged portion 6, in which is cut clutch teeth 7, adapted to mesh with the gear teeth 8 of the splined sliding gear 9. The drum 5 is held in place by the snap ring 5a. The spring clutch member 3 is separated from the gear teeth 10 by the washer 11, which prevents the free end of the spring 3 from catching in the teeth 10. The other end of the spring 3 is preferably offset, as at 12, and inserted in the hole 13. By holding the end of the spring clutch member 3 in some such manner as shown at 12, fewer coils are necessary on the drum 5 to produce a locking effect. It is, however, possible to fasten the end of the spring to the drum 5 without any coils on the said drum.

The radial pressure of the spring 3 on the drums 2 and 5 due to the fact that the outside diameter of the drums is greater than the normal inside diameter of the spring, produces a frictional drag, which, when the drum 2 is turned in a direction to wind up the spring, causes the spring to tightly grip the drum in a well known manner and turn with it. In like manner the spring also grips the drum 5 and drives it, thereby forming a one-way driving or coupling connection between the drums 2 and 5. However, when the spring is turned in the same direction as the drum 2 was turned to cause the spring to grip the drum, that is when the part 6 tends to turn faster than the drum 2, the spring tends to unwind and does not grip the drum 2, so that the part 6 and the spring 3 can turn in the same direction as the shaft 1 and at a faster speed without causing said shaft to rotate.

The gear 9 is shifted to the left so that the teeth 8 mesh with the teeth 7 for coasting or one way drive, and is moved still farther to the left so that the teeth 14 mesh with the teeth 15 for positive or two-way drive. Some of the teeth 20 15 are foreshortened as at 16 to facilitate engagement. This same is true of the teeth 14 as shown at 17.

The free end of the spring clutch member shown in Figures 1 and 2 will tend to unwind or expand due to centrifugal force, and will thereby tend to cause the clutch to slip if the speed is high enough, unless sufficient radial tension or additional coils are provided. In order to employ this type of clutch with a minimum number of coils, and to obviate undesired expansion of the spring, such as may be due to centrifugal force, I have provided a centrifugal device, one form of which is shown in Figures 4 and 5 and another in Figure 6.

In the form of centrifugal device shown in Figures 4 and 5, the plate 19 is provided with weighted parts 20, pivoted at 21. These weighted parts are acted on by centrifugal force which causes their ends 22 to press the free end and last coil of the spring 23 against the drum 24, thereby neutralizing the centrifugal force of the free end of the spring which causes it to unwind, and even increasing the radial pressure of the free end of the spring on the drum. By means of these centrifugally responsive parts the resilient radial pressure of the spring on the drum could be obviated, that is, the outside diameter of the drum could be made slightly smaller than the inside diameter of the spring. With such an arrangement, the spring, in response to the action of the centrifugally acting parts, would provide the necessary grip whenever it is brought into play, in view of the fact that the parts will be running at sufficiently high speed to make this possible.

A modification of the structure shown in Figure 4 is illustrated in Figure 6, wherein a part designated 25 is provided with a conical portion 26, adapted to engage the end of the spring clutch member 27 as shown. This conical portion 26 is adapted to press the end of the spring against the drum 28, when the balls 29, responding to centrifugal force, tend to climb up the inclined portion 30 of the part 25, thereby forcing it to the right. It will be appreciated that while the wall of the member 31 in Figure 6 is radial and the corresponding wall of the member 30 is inclined, these parts could be varied in form, i. e., said wall of the member 30 could very well be made radial and the wall of the member 31 inclined, or both could be inclined, and the same result accomplished. Moreover, the balls could be replaced by non-spherical members of any suitable description, such as rollers if so desired, and the cooperating parts of the centrifugally operated device could be correspondingly formed.

The above described construction illustrated in Figure 1 is susceptible of various modifications, one of which is illustrated in Figure 7, wherein the drive shaft 32 is splined at 33. A drum 34, provided with a centrally splined portion 35, suitably meshed with the teeth 33, is securely fastened to the shaft 32 by any suitable means. The internal diameter at 36 of the drum 34 is made slightly smaller than the normal outside diameter of the spring 37. A hole 38 is provided for the offset end 39 of the spring 37, to prevent rotation of the drum 34 with respect to the spring 37. Another drum 40 having an internal diameter at 41 approximately the same as the diameter at 36 is centered on the part 34 at 42, and held in place by the snap ring 43, and is provided with clutch teeth 44 adapted to mesh with the gear teeth 45 of the sliding gear 46 upon movement of the gear 46 to the left, to provide a one-way drive. The gear 46 is provided with clutch teeth 47, adapted to mesh with the clutch teeth 35 upon further movement of the gear 46 to the left, in response to an extended or overshift of the gear shift lever, thereby providing a direct two-way drive.

When the shaft 32 is driven so as to unwind the spring 36, said spring, due to the radial pressure caused by the fact that the normal outside diameter thereof is greater than the internal diameter of the drums 34 and 40, grips tightly on the inside of the drums and causes them to turn with the shaft 32. Should, however, the drum 40 be caused to turn faster than the drum 34, in the same direction, an occurrence which is manifest when the vehicle is traveling at a relatively high speed, the spring will tend to wind up and thereby reduce its diameter, and the shaft 32 will then not turn with the shaft 48, thereby giving a one-way drive connection from the drive gear 32 to the shaft 48, when the teeth 45 of the gear 46 are in mesh with the teeth 44, and the teeth 47 have not been meshed with the teeth 35. For the two-way direct drive, the teeth 47 are meshed with the teeth 35, as previously explained.

With this location of the spring, it is evident that the action of centrifugal force will increase the pressure of the spring on the drums, rather than decrease it as in the form shown in Figure 2.

It will be appreciated that in both of the forms shown in Figures 2 and 7, while the drum portions engageable by the spring are substantially cylindrical, their shape may be otherwise, as, for example, conical if so desired, and the spring correspondingly formed. Moreover the engagement of the spring for frictional purposes may be limited to only one drum, in view of the fact that frictional engagement between the spring and the member to which it is non-rotatably secured is not absolutely necessary.

It will be noted that in every form of the invention described, the shift lever is adapted to occupy a conventional position corresponding to the position occupied by setting up the direct drive in the usual type of transmission, the shifting means being suitably modified in accordance with the requisites of this invention so that the lever may be subjected to extended movement or overshift, whereby to short-circuit the one-way drive of my invention and set up a two-way direct drive corresponding to direct drive in other transmission systems.

It will be noted that the clutch elements 5, and 46, by reason of their loose mounting with respect to the engine or drive shafts 1 and 32, may be clutched by the sliding gears 9 and 46, for one-way or free wheeling drive, without necessitating the use of the ordinary engine clutch, since the loosely mounted clutch part acquires very little momentum.

I am aware that many changes may be made and numerous details of construction may be varied through a wide range without departing from the principles of this invention and I therefore do not purpose limiting the patent granted hereon, otherwise than necessitated by the prior art.

The plate 19 is driven by friction between the spring and the gear teeth, or by being fastened to the drive shaft 1.

I claim as my invention:

1. In a mechanism of the class described, a drive member having a reduced end, a clutch instrumentality rotatably carried by said reduced end, means preventing relative longitudinal movement between said member and said instrumentality, said member and instrumentality having peripheries flush with each other, a coiled element normally in frictional engagement with said peripheries, said member having a portion normally in frictional engagement with one end of said element, the other end of said element being non-rotatably connected to said instrumentality, a driven member, a slidable device relatively non-rotatably carried by said driven member, said device having external and internal teeth, and said instrumentality having internal teeth and said drive member having external teeth adapted to be clutched progressively with the external and internal teeth respectively of the slidable device, whereby a one-way or a two-way drive may be selectively established between the drive and driven members.

2. In a mechanism of the class described, a drive member, a clutch instrumentality rotatably carried by said member, and means preventing relative longitudinal movement between said member and instrumentality, said member and instrumentality having peripheries flush with each other, a coiled element normally in frictional engagement with said peripheries, said member having a portion normally in frictional engagement with one end of said element, the other end of said element being non-rotatably connected to said instrumentality, a driven member, means for coupling said instrumentality and driven member for rotation together to thereby establish a one-way drive between said members, and means for short-circuiting said drive and at the same time establishing a two-way drive between said members.

3. In a mechanism of the class described, a drive member, a clutch instrumentality rotatably carried by said member, and means preventing relative longitudinal movement between said member and instrumentality, said member and instrumentality having peripheries flush with each other, a coiled element normally in frictional engagement with said peripheries, said member having a portion normally in frictional engagement with one end of said element, the other end of said element being non-rotatably connected to said instrumentality, a driven member, means for coupling said instrumentality and driven member for rotation together to thereby establish a one-way drive between said members, and means for short-circuiting said drive and at the same time establishing a two-way drive between said members, both of said means being slidable relative to one of said members.

4. In a mechanism of the class described, a drive member, a driven member, and a flexible element normally in frictional engagement with one of the members, and connected against relative rotation with the other member, whereby, when the speed of one of the members tends to exceed that of the other, said element will engage the one member more tightly so that a positive drive between said members will be established, and when the speed of the other member tends to exceed that of the one member, the grip of the element will be released to allow relative rotation of the members, and centrifugal means for counter-acting the loosening effect of centrifugal force on said element.

5. In a mechanism of the class described, a drive member, a driven member, and a flexible element normally in frictional engagement with one of the members, and connected against relative rotation with the other member, whereby, when the speed of one of the members tends to exceed that of the other, said element will engage the one member more tightly so that a positive drive between said members will be established, and when the speed of the other member tends to exceed that of the one member, the grip of the element will be released to allow relative rotation of the members, and means for counter-acting the loosening effect of centrifugal force on said element, said means including one or more unbalanced dogs loosely mounted adjacent the outer periphery of said element, the lighter end of each dog being engageable with said periphery with a pressure commensurate with the speed of said member to prevent expansion of said element due to centrifugal force.

6. In a mechanism of the class described, a drive member, a driven member, and a flexible element normally in frictional engagement with one of the members, and connected against relative rotation with the other member, whereby, when the speed of one of the members tends to exceed that of the other, said element will engage the one member more tightly so that a positive drive between said members will be established, and when the speed of the other member tends to exceed that of the one member, the grip of the element will be released to allow relative rotation of the members, and means for counteracting the loosening effect of centrifugal force on said element, said means including a cam overlying the free end of said element, an abutment on said member, said abutment and cam having juxtaposed outwardly converging walls and means disposed intermediate said walls and movable outwardly in response to centrifugal force to thereby shift said cam toward the free end of said element, whereby said cam will press the free end of said element inwardly.

7. In a mechanism of the class described, a drive member, a driven member, and a flexible element normally in frictional engagement with one of the members, and connected against relative rotation with the other member, whereby, when the speed of one of the members tends to exceed that of the other, said element will engage the one member more tightly so that a positive drive between said members will be established, and when the speed of the other member tends to exceed that of the one member, the grip of the element will be released to allow relative rotation of the members, and means for counter-acting the loosening effect of centrifugal force on said element, said means including a cam overlying the free end of said element, an abutment on said member, said abutment and cam having juxtaposed outwardly converging walls and means disposed intermediate said walls and movable outwardly in response to centrifugal force to thereby shift said cam toward the free end of said element, whereby said cam will press the free end of said element inwardly.

8. In a mechanism of the class described, a drive member, a driven member, and a flexible element normally in frictional engagement with one of the members, and connected against relative rotation with the other member, whereby, when the speed of one of the members tends to exceed that of the other, said element will engage the one member more tightly so that a positive drive between said members will be established, and when the speed of the other member tends to exceed that of the one member, the grip of the element will be released to allow relative rotation of the members, and centrifugally actuated cam means engageable with the outer periphery of said element for preventing radial expansion of said element.

9. In a mechanism of the class described, a drive member, a clutch instrumentality rotatably carried by said member, means preventing relative longitudinal movement between said member and said instrumentality, an element normally in frictional engagement with said member and non-rotatably connected to said instrumentality, a driven member, a device non-rotatably carried by said driven member and slidable relative thereto, said device having external and internal teeth, and said instrumentality having internal teeth and said drive member having external teeth adapted to be clutched progressively with the external and internal teeth respectively of the slidable device, whereby a one way or a two way drive may be selectively established between the drive and driven members.

CARL F. RAUEN.